(12) United States Patent
Miyake

(10) Patent No.: US 10,184,378 B2
(45) Date of Patent: Jan. 22, 2019

(54) EXHAUST GAS PURIFICATION SYSTEM AND METHOD FOR A WORK VEHICLE

(71) Applicant: KUBOTA CORPORATION, Osaka (JP)

(72) Inventor: Hiroshi Miyake, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 1 day.

(21) Appl. No.: 15/592,552

(22) Filed: May 11, 2017

(65) Prior Publication Data

US 2017/0342885 A1   Nov. 30, 2017

(30) Foreign Application Priority Data

May 27, 2016 (JP) .................. 2016-106395

(51) Int. Cl.
*F01N 11/00* (2006.01)
*F01N 3/20* (2006.01)
*F01N 9/00* (2006.01)

(52) U.S. Cl.
CPC .......... *F01N 3/208* (2013.01); *F01N 3/2066* (2013.01); *F01N 9/00* (2013.01); *F01N 11/00* (2013.01); *F01N 2550/05* (2013.01); *F01N 2560/07* (2013.01); *F01N 2590/08* (2013.01); *F01N 2610/01* (2013.01); *F01N 2610/02* (2013.01); *F01N 2610/144* (2013.01); *F01N 2610/146* (2013.01); *F01N 2610/1433* (2013.01); *F01N 2610/1453* (2013.01); *F01N 2610/1493* (2013.01); *F01N 2900/04* (2013.01); *F01N 2900/06* (2013.01); *F01N 2900/08* (2013.01); *F01N 2900/10* (2013.01); *F01N 2900/16* (2013.01); *F01N 2900/18* (2013.01); *Y02T 10/24* (2013.01); *Y02T 10/47* (2013.01)

(58) Field of Classification Search
CPC ..... F01N 3/208; F01N 3/2066; F01N 2610/02
See application file for complete search history.

(56) References Cited

U.S. PATENT DOCUMENTS

| 9,441,514 B2 | 9/2016 | Tanaka et al. |
| 2012/0036838 A1 | 2/2012 | Furuya |
| 2013/0032214 A1 | 2/2013 | Saby et al. |
| 2015/0239410 A1 | 8/2015 | Farman et al. |

FOREIGN PATENT DOCUMENTS

| EP | 2 682 581 | 1/2014 |
| JP | 2015-175265 | 10/2015 |

*Primary Examiner* — Jonathan Matthias
(74) *Attorney, Agent, or Firm* — Greenblum & Bernstein, P.L.C.

(57) ABSTRACT

A work vehicle includes an engine, a battery, an exhaust gas purification system or device, and a notification device. The exhaust gas purification system or device is capable of performing a purification process purifying exhaust gas of the engine, and operates with electric power from the battery and performs an end process. The notification device provides notification that the exhaust gas purification system or device is performing the end process or that the end process is completed.

16 Claims, 4 Drawing Sheets

EXHAUST GAS PURIFICATION SYSTEM AND METHOD FOR A WORK VEHICLE

CROSS-REFERENCE TO RELATED APPLICATIONS

The present application claims priority under 35 U.S.C. § 119 of Japanese Application No. 2016-106395, filed on May 27, 2016, the disclosure of which is expressly incorporated by reference herein in its entirety.

BACKGROUND OF THE INVENTION

1. Field of the Invention

The present invention relates to an exhaust gas purification system and method for a work vehicle such as a tractor.

2. Description of Related Art

Exhaust gas purification systems are conventional. A technology disclosed in Japanese Patent Laid-open Publication No. 2015-175265, for example, uses an exhaust gas purification device to purify exhaust gas discharged from an engine in a work vehicle such as a tractor.

The exhaust gas purification device disclosed in JP 2015-175265 is a nitrogen selective catalytic reduction (SCR) system purifying $NO_x$ contained in exhaust gas. In the nitrogen SCR system, aqueous urea stored in a tank is suctioned up by a pump and is injected into the exhaust gas by an injector, thereby substituting harmless substances ($H_2O$, $N_2$) for $NO_x$.

The work vehicle using the nitrogen SCR system typically has a battery mounted in the work vehicle. When performing maintenance, repair, or the like, on the work vehicle, one typically starts with a power supply interruption task which typically involves a disconnecting of the battery cord from the battery and/or activating (turning off) a breaker connecting the battery to various devices of the work vehicle. On the other hand, in vehicles with an exhaust gas purification device, after the engine stops running, an end process can be taking place which involves collecting the aqueous urea contained in pipes, for example. The end process, however, requires power and can be interrupted during power supply interruption. As such, when the end process is being performed by the exhaust gas purification device, in a case where there is a power supply interruption, the end process may be stopped partway through (not fully completed). This results in some aqueous urea remaining in the system pipes because it was not properly or fully collected.

SUMMARY OF THE INVENTION

In view of the above circumstances, the present invention provides a work vehicle capable of preventing a power supply interruption task from being carelessly performed during an end process of an exhaust gas purification device.

Non-limiting systems and methods are herein disclosed which can prevent or make less likely an interruption in the completion of the end process.

A work vehicle according to the present invention can include an engine, a battery, an exhaust gas purification device, and a notification device. The exhaust gas purification device is capable of performing a purification process purifying exhaust gas of the engine, and includes a driver (or purification fluid delivery system) which, after the purification process, operates with electric power from the battery and performs an end process. The notification device provides notification that the driver of the exhaust gas purification device is performing the end process.

Also, a work vehicle can include an engine, a battery, an exhaust gas purification device, and a notification device. The exhaust gas purification device is capable of performing a purification process purifying exhaust gas of the engine, and includes a driver which, after the purification process, operates with electric power from the battery and performs an end process. The notification device provides notification that the end process by the driver of the exhaust gas purification device is completed.

The exhaust gas purification device can include a tank storing aqueous urea; a duct through which the aqueous urea passes; and a nozzle injecting the aqueous urea in the duct into an exhaust channel through which the exhaust gas of the engine passes. The driver includes a pump capable of discharging the aqueous urea within the tank during the purification process, the pump operating with electric power from the battery and performing suction intake of aqueous urea in the duct during the end process. During the suction intake by the pump, the notification device provides notification that the end process is being performed.

The exhaust gas purification device can also include a tank storing aqueous urea; a duct through which the aqueous urea passes; and a nozzle injecting the aqueous urea in the duct into an exhaust channel through which the exhaust gas of the engine passes. The driver includes a pump capable of discharging the aqueous urea within the tank during the purification process, the pump operating with electric power from the battery and performing suction intake of the aqueous urea in the duct during the end process. When the suction intake by the pump is stopped, the notification device provides notification that the end process is completed.

The exhaust gas purification device may also include a circulation channel capable of connecting to any of the tank, the duct, and the pump. The driver includes an actuation valve provided at an intermediate portion of the circulation channel, the actuation valve circulating the aqueous urea through the circulation channel by opening during the end process due to electric power from the battery. While the actuation valve is open, the notification device provides notification that the end process is being performed. The notification device is arranged in a vicinity of the battery.

The present invention aims to prevent a power supply interruption task from being carelessly performed during an end process of an exhaust gas purification device.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
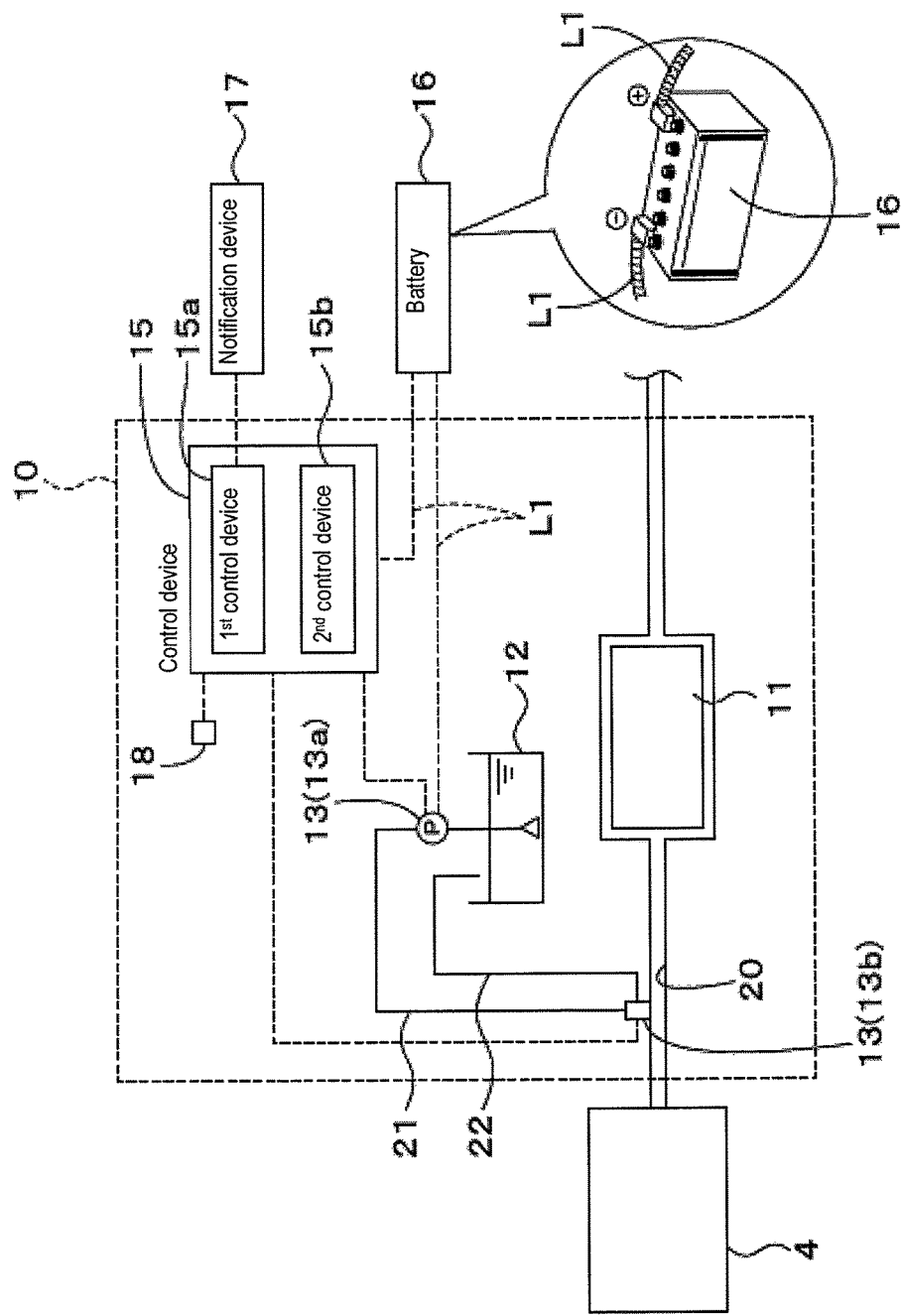
FIG. 1 is a schematic view of an exhaust gas purification device.
Figure 2:
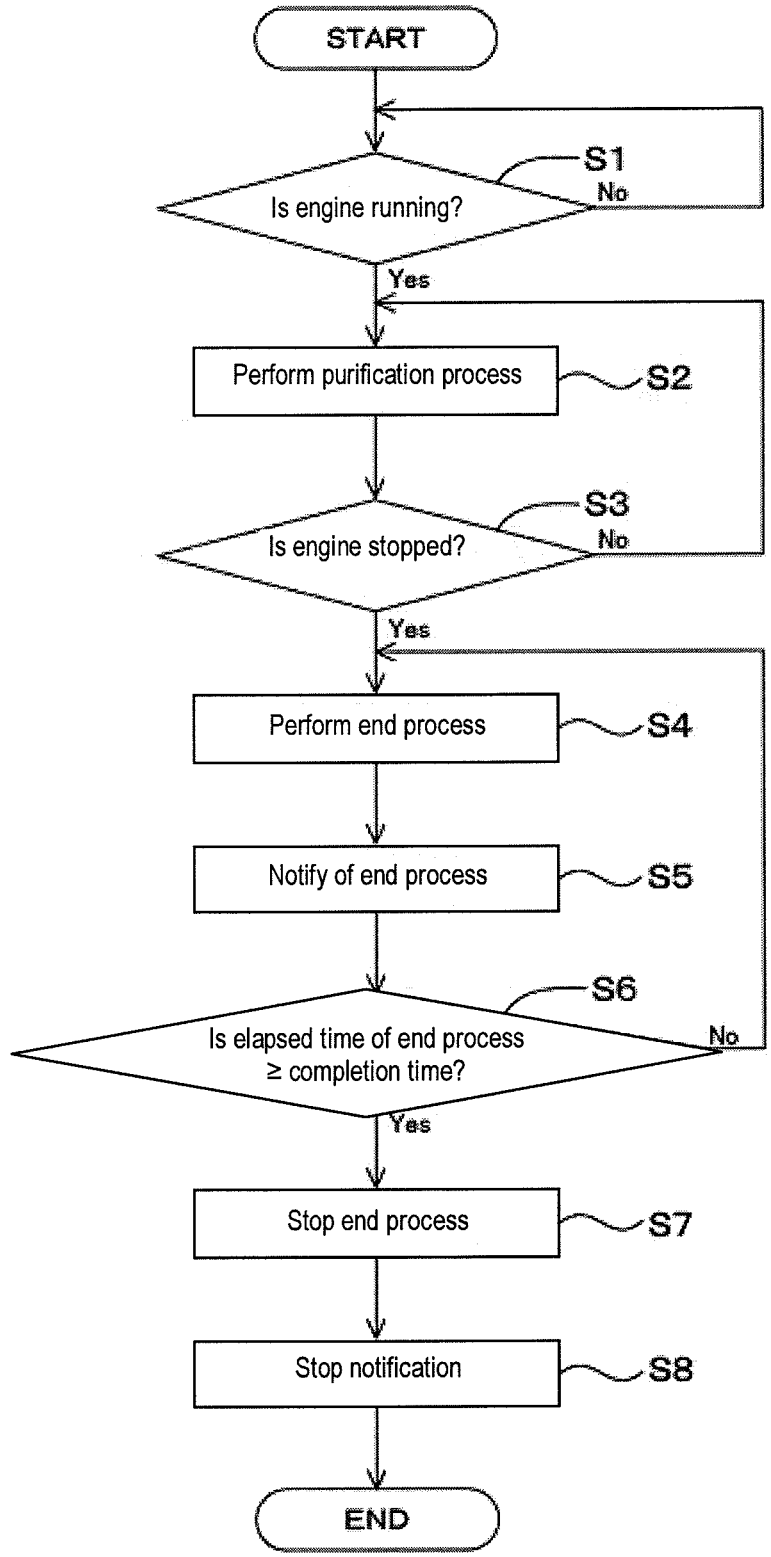
FIG. 2 is a flow chart of operations of the exhaust gas purification device.
Figure 3:
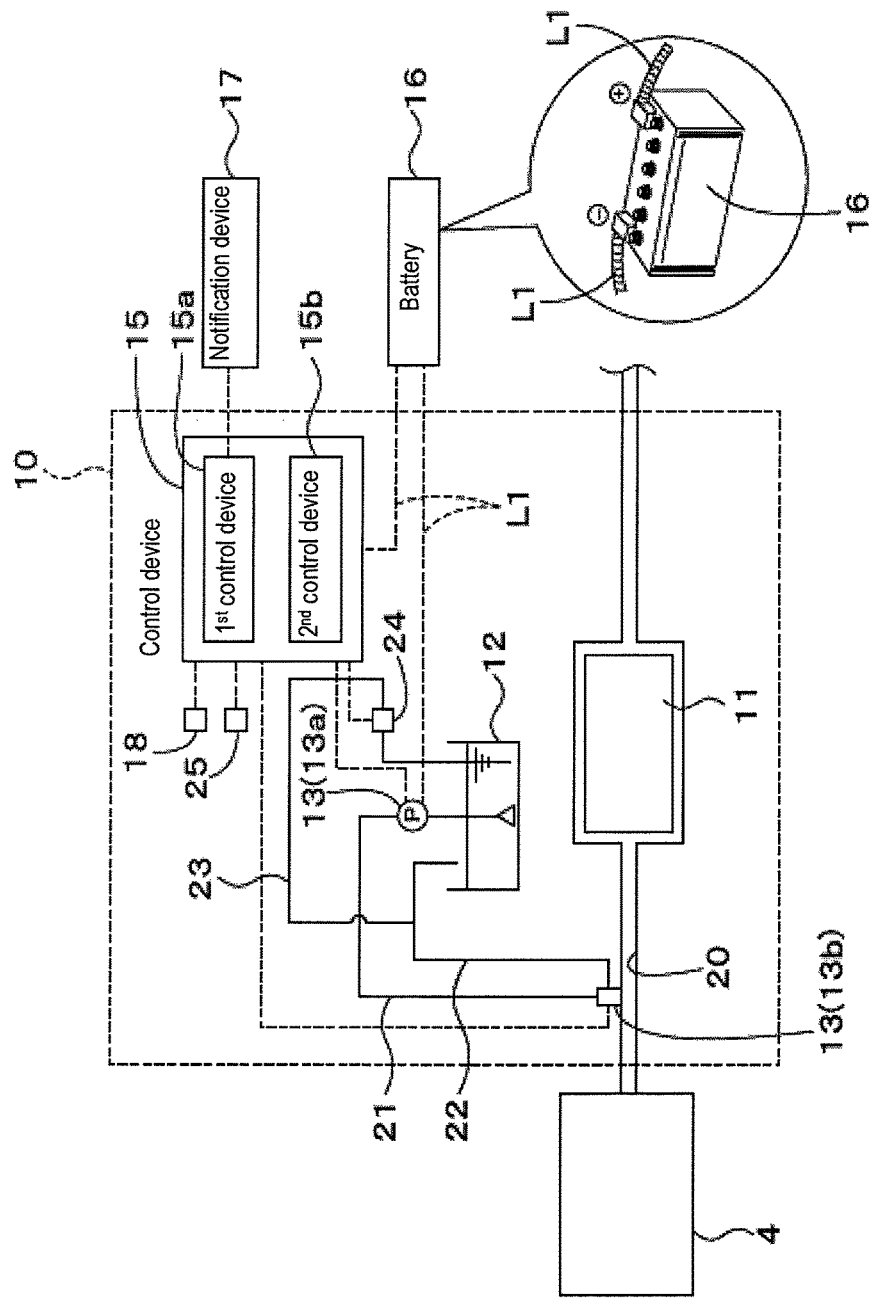
FIG. 3 is a schematic view of a modification of an exhaust gas purification device.

Embodiments of the present invention are described below with reference to the drawings with FIGS. 1 and 3 showing exemplary systems and with FIG. 2 showing an exemplary method.

Figure 4:
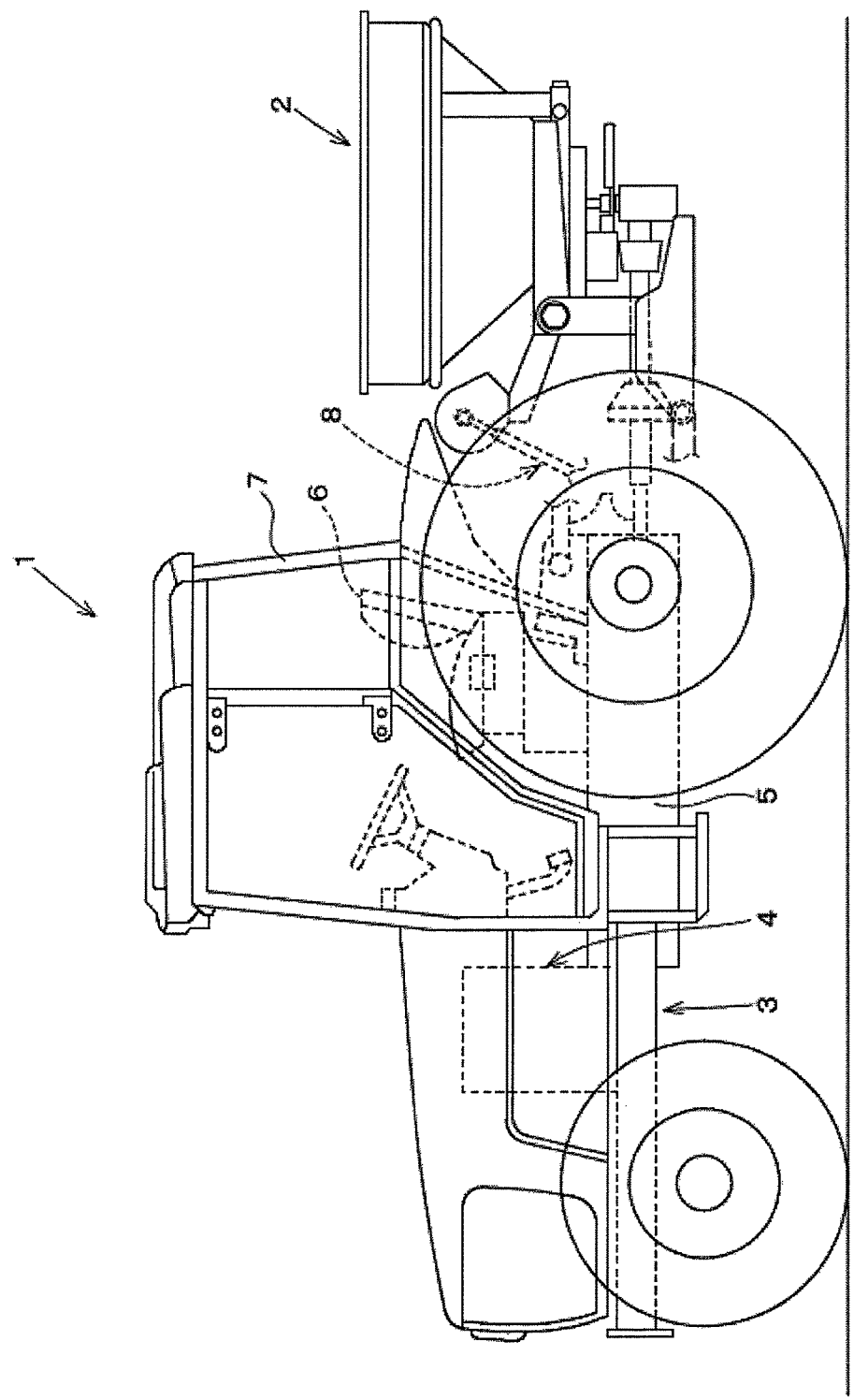
FIG. 4 is an overall view of a work vehicle.

FIG. 4 depicts an overall view of a tractor 1 as an exemplary a work vehicle. The work vehicle is not limited to a tractor, and may instead be a vehicle such as an agricultural vehicle, a combine or rice transplanter, or a construction vehicle.

As shown in FIG. 4, the tractor 1 includes a traveling vehicle body 3 having, among other things, wheels, a motor 4, and a transmission device 5. The motor 4 can be a diesel engine, gasoline engine, electric motor, or the like. In this embodiment, the motor 4 is a diesel engine (hereafter referred to as "engine").

In addition, the traveling vehicle body 3 includes a driver seat 6 as well as a cabin 7 encompassing or enclosing the driver seat 6. A coupler 8 can be utilizes such as a three-point hitch or hitching mechanism (or the like) and is located on a rear portion of the traveling vehicle body 3. A work apparatus 2 can be attached and detached from the coupler 8. By coupling the work apparatus 2 (for example, a tilling device, a fertilizer applicator, or a chemical spraying apparatus) to the coupler 8, the work apparatus 2 can be towed by the traveling vehicle body 3.

The tractor 1 of FIG. 4 can be provided with the system of FIG. 1. This system includes an exhaust gas purification device 10. The exhaust gas purification device 10 is a device purifying exhaust gas emitted from an engine 4 and may be, for example, a nitrogen SCR device (nitrogen SCR system) that purifies $NO_x$ contained in the exhaust gas.

Specifically, in the case where exhaust gas is emitted while the engine 4 is running or is emitted from the engine 4, the exhaust gas purification device 10 can perform a purification process purifying the exhaust gas. The exhaust gas purification device 10 can also perform an end process which collects aqueous urea after the purification process, or the like. As noted above, the end process is a process that takes place after the engine has stopped running whereby the device 10 can collect unused purification fluid that remains in the system.

The exhaust gas purification device 10 includes an SCR catalyst 11, a tank 12, a driver (or purification fluid delivery system) 13, and a control device 15.

The SCR catalyst 11 functions to reduce $NO_x$ in the exhaust gas, and is arranged on or coupled to an exhaust channel or pipe 20 through which the exhaust gas of the engine 4 travels or flows. The SCR catalyst 11 causes the aqueous urea supplied to the exhaust channel 20 and the $NO_x$ in the exhaust gas to react. The resulting reaction substitutes or converts $NO_x$ into the harmless substances ($H_2O$, $N_2$). The tank 12 is a tank used for storing the aqueous urea.

The purification fluid delivery system 13, when driven by electricity or the like, delivers the fluid to purify the exhaust gas of $NO_x$. The system 13 includes a pump 13a and a nozzle 13b. The pump 13a can be an electric pump connected to a battery 16 via power line(s) L1 and can thus be driven by electric power supplied from the batter 16 or the like. The pump 13a may be driven by either direct or alternating current. In the case of direct current, the pump 13a is driven by electric power from the power line(s) L1, which is connected to the battery 16. In the case of alternating current, the pump 13a can be driven by electric power output from a DC/AC converter (not shown in the drawings) coupled to the power line(s) L1 between the pump 13a and the battery 16.

The pump 13a can be of the type that operates both in forward rotation or reverse rotation. During forward rotation, the aqueous urea in the tank 12 is sucked up from a suction intake and is discharged into a duct 21 that connects the pump 13a to the nozzle 13b. During reverse rotation, the pump 13a sucks in the aqueous urea in the duct 21 and returns the suctioned aqueous urea to the tank 12. The duct 21 can be a pipe, hose, or the like, and has a first end connected to the pump 13a and a second end connected to the nozzle 13b.

The nozzle 13b is a device that can inject the aqueous urea received from the duct 21 into the exhaust channel 20. The nozzle 13b can, for example, include a solenoid valve, which can be energized by a control signal output from the control device 15. Thus, for example, energizing the solenoid valve can causes a change in the injector, opening or closing of the injector as well as changes in the injector opening. In other words, the amount of aqueous urea injected into the exhaust channel 20 can change based on the control signal.

The system 10 also utilizes a discharge channel or pipe 22. A first end of the discharge channel 22 is connected to the nozzle 13b and a second end of the discharge channel 22 is connected to an upper portion of the tank 12. With this arrangement, the aqueous urea not injected into the exhaust channel 20 can be discharged into the tank 12 via the discharge channel 22.

A control device 15 is used to control the system 13 (pump 13a and nozzle 13b), and can have the form of a CPU or the like. The control device 15 is connected to the battery 16 via a power line(s) L1 and is supplied with electric power from the battery 16. The control device 15 can include a first controller 15a and a second controller 15b. The first controller 15a and the second controller 15b can be have the form of computer hardware and/or a program stored in the control device 15, or the like.

The first control device can function as follows. In a case where the engine 4 is running, the first controller 15a executes control (purification control) to clean the exhaust gas by outputting a control signal to the system 13 (pump 13a and nozzle 13b). The operation of the engine 4 can be detected based on signals from one or more travel mechanisms 18 (such as, e.g., an ignition switch, one or more engine rotation sensors, injector sensors, and the like) which related to the operation of the engine 4. Each travel mechanism 18 can be connected to or otherwise communicate with the control device 15. For example, the mechanism 18 can sense one or more of the following: a signal indicating that the ignition switch is on, a signal indicating the engine rotations detected by the engine rotation sensor, a signal indicating that the injector is operating, or the like. This is then input to the control device 15. In this way, the first controller 15a can determine that the engine 4 is running so that purification control can be activated or performed. The just-described way or ways of determining that the engine 4 is running is not limited to that described and can include others.

A sensor (not shown) such as gas detection sensor, gas flow amount sensor, or the like, can also be provided to the exhaust channel 20. This sensor can detect whether exhaust gas is flowing inside the exhaust channel 20. Then, in the case where the sensor detects that exhaust gas is flowing in the exhaust channel 20, the first controller 15*a* may perform the purification control. The exhaust sensor can be of the type described in U.S. Pat. No. 9,441,514 to Tanaka issued on Sep. 13, 2016, the entire disclosure of which is herein expressly incorporated by reference in its entirety.

In the purification control mode, the first controller 15*a* outputs a control signal to the pump 13*a* to perform normal rotation. This results in flow of urea from the tank 12 to the nozzle 13*b*. Also, as part of the purification control, the first controller 15*a* outputs a control signal to the solenoid of the nozzle 13*b* to open the nozzle 13*b*. This results in the injection of urea into the exhaust channel 20. Accordingly, when the first controller 15*a* performs the purification control mode, the aqueous urea stored in the tank 12 is supplied to the nozzle 13*b* via the pump 13*a*, the aqueous urea supplied to the nozzle 13*b* is injected into the exhaust channel 20. The result is that the exhaust gas in the exhaust channel 20 can be cleaned by the injected aqueous urea.

After the purification control mode (purification process) ends, the second controller 15*b* can then execute an end control mode (end process). The end control mode (end process) refers to a control (a process) by which the system 13 collects the aqueous urea in the path where the aqueous urea travels (nozzle 13*b* and duct 21). This mode can also function to lower a temperature of the exhaust gas purification device 10 or the like.

For example, in the case where the engine 4 has transitioned from a running state to a stopped (not running) state, i.e., a state where flow of the exhaust gas has stopped, the second controller 15*b* can execute the end control mode. In the end control mode, the second controller 15*b* outputs a control signal to the pump 13*a* to perform reverse rotation. The result is that urea can flow from the nozzle 13*b* to the tank 12 via the line 21. The end mode can occur for a predetermined amount of time. For example, a completion time of the end control can be stored ahead of time in a memory of the control device 15 or the like, and can be defined or set to be some tens of minutes, for example. The second controller 15*b* can thus measure the amount of time (elapsed time) the end control mode is performed using an internal timer or the like. This way, in the case where the elapsed time measured by the internal timer reaches the completion time, the second controller 15*b* can end the end control mode. In other words, the output of the control signal to the pump 13*a* can be stopped at this point. The completion time is not limited to the amount of time described above, and may be defined based on an amount of time sufficient to allow all or nearly all of the aqueous urea is collected, for example.

When the second controller 15*b* executes the end control mode, the aqueous urea in the discharge channel 22 can thus be returned to the pump 13*a* via the nozzle 13*b* and the duct 21. This means that the aqueous urea in the nozzle 13*b* can be returned to the pump 13*a* via the duct 21 and also that the aqueous urea in the duct 21 can return directly to the pump 13*a*. In this way, the aqueous urea in the nozzle 13*b*, the duct 21, and the discharge channel 22 can be sucked in by the pump 13*a* and returned to the tank 12. Thus, the aqueous urea can be prevented from remaining in the system (the duct 21, the nozzle 13*b*, and the discharge channel 22). In other words, the aqueous urea can be prevented from remaining in the path where the aqueous urea travels during engine operation.

In the end control mode (end process), at least the control device 15 and the pump 13*a* operate. However, in the case where a terminal of the power line (battery cord, harness, or the like) L1 is separated from the battery 16 while executing the end control mode, the end process can ends partway through which can result in some aqueous urea remaining in the path where the aqueous urea travels (such as the nozzle 13*b* and duct 21). Thus, given the configuration (direction) illustrated in the following paragraphs, careless separation of the power line L1 from the battery 16 during execution of the end process can be prevented.

To prevent careless separation or power interruption during the end control mode, the invention can employ a notification device 17. As shown in FIG. 1, the device 17 is connected to the control device 15. The notification device 17 can be located in a vicinity of the battery 16 (for example, beside the battery 16, above the battery 16, near a terminal of the battery 16). Alternatively, the notification device 17 can be located in a vicinity of the driver seat 6 (for example, a metal panel provided in front of the driver seat 6). The notification device 17 can be configured as a speaker, LED, liquid crystal panel, or the like, and can provide an indication, warning, or notification via audio, visual (character display, light, or the like) so that one is made aware that the system 13 of the exhaust gas purification device 10 is performing the end process. For example, while the second controller 15*b* is outputting the control signal to the pump 13*a* (during suction intake of the aqueous urea by the pump 13*a*), the control device 15 can output to the notification device 17 a command that provides an external notification indicating that the end process is being performed (notification command). Based on the notification command from the control device 15, the notification device 17 provides a notification that the end process is being performed, or that the suction intake by the pump 13*a* is being performed. This notification informs those who might disconnect the battery or otherwise perform a power interruption that the end control mode is still operating and/or that they should wait until the end control mode ends before doing so.

FIG. 2 is an exemplary flow chart of operations of the exhaust gas purification device in accordance with a method of practicing the invention.

As shown in FIG. 2, based on the signals from the traveling mechanisms, the control device 15 first determines whether the engine 4 is running (S1). In a case where the engine 4 is running (S1: Yes), the first controller 15*a* operates the pump 13*a* and the nozzle 13*b* of the exhaust gas purification device 10 and executes the purification process (S2). Based on the signals from the traveling mechanism(s), the control device 15 determines whether the engine 4 has transitioned from the running state to the stopped state (S3). In a case where the engine 4 has not transitioned from the running status to the stopped status (S3: No), the first controller 15*a* continues the purification process. Meanwhile, in a case where the engine 4 has transitioned from the running status to the stopped status (S3: Yes), the second controller 15*b* operates the pump 13*a* of the exhaust gas purification device 10 and executes the end process (S4). In addition, the control device 15 outputs the notification command to the notification device 17, and the notification device 17 provides a notification (e.g., audio or visual) that the end process is being performed (S5). The second controller 15*b* determines whether the elapsed time of the end process has reached the completion time that was defined ahead of time (S6). In a case where the elapsed time of the end process has not reached the completion time (S6: No), the second controller 15*b* continues the end process and notification is continued. In a case where the elapsed time of the end process has reached the completion time (S6: Yes), the second controller 15b stops the end process (S7). In addition, the control device 15 stops the output of the notification command to the notification device 17, and the notification device 17 stops providing the notification that the end process is being performed (S8). One now knows that power interruption can be performed and that doing so will not prevent completion of the end control mode; because the end control mode has already been completed.

As noted above, the notification device 17 provides external or exterior notification that the exhaust gas purification device 10 is performing the end process. Therefore, even in a state where the engine 4 has stopped running, an operator driving the tractor 1, a mechanic performing maintenance or the like on the tractor 1, or the like, can know that the exhaust gas purification device 10 is operating to perform the end process, and separation of the battery cord or the like from the battery 16 during the end process should not occur (and can be prevented).

In the embodiment described above, the notification device 17 provides the notification that the system 13 is performing the end process. However, the notification device 17 may instead provide notification that the end process in the system 13 is completed. For example, in the end control mode, when the second controller 15b stops the output of the control signal to the pump 13a, the control device 15 outputs to the notification device 17 the notification command showing that the end process has completed (ended). Based on the notification command from the control device 15, the notification device 17 provides a notification to the exterior that the suction intake by the pump 13a is completed. In such a case, after the engine 4 has transitioned from the running state to the stopped state, the operator, mechanic, or the like, can know a time at which the end process of the exhaust gas purification device 10 is completed. Accordingly, since the operator, mechanic, or the like, separates the battery cord or the like from the battery 16 after the end process is completed, careless separation of the battery cord from the battery 16 during the end process can be prevented.

FIG. 3 depicts a modification of the exhaust gas purification device 10. The exhaust gas purification device 10 can include a circulation channel 23, an actuation valve 24, and a measurement device 25. As shown in FIG. 3, a first end of the circulation channel 23 is arranged in a lower portion of the tank 12, and a second end of the circulation channel 23 is connected to the discharge channel 22. The actuation valve 24, which circulates the aqueous urea, is coupled to the circulation channel 23. The actuation valve 24 is one structural element included in the system 13, and can be configured as a magnetic valve capable of opening and closing. The actuation valve 24 opens and closes with a control signal output from the control device 15. In other words, the actuation valve 24 operates with the electric power of the battery 16. The measurement device 25 can be a device measuring a temperature of the aqueous urea, or measuring a temperature in an area around the exhaust gas purification device 10. The temperature of the aqueous urea or the temperature if the area around the exhaust gas purification device 10, measured by the measurement device 25, can be input to the control device 15.

In the case of the purification process mode, the first controller 15a demagnetizes the solenoid of the actuation valve 24 and closes the actuation valve 24. Also, the first controller 15a causes the pump 13a to perform forward rotation and opens the nozzle 13b. Thus results in the injection of urea into the exhaust system. Meanwhile, in the case of the end process mode, the second controller 15b of the control device 15 magnetizes the solenoid of the actuation valve 24 and opens the actuation valve 24. Also, in a state where the actuation valve 24 is open, the second controller 15b closes the nozzle 13b by demagnetizing the solenoid of the nozzle 13b and causes the pump 13a to perform forward rotation. Therefore, in the end process mode, the aqueous urea is circulated through the suction intake of the pump 13a, the duct 21, the nozzle 13b, the discharge channel 22, and also the circulation channel 23. Accordingly, the path where the aqueous urea travels, as well as the entire exhaust gas purification device 10, can be cooled.

Also, in the end process, under conditions where the aqueous urea is being circulated, when the temperature of the aqueous urea or the temperature in the area around the exhaust gas purification device 10, measured by the measurement device 25, is equal to or less than a predetermined temperature, the second controller 15b can cause the pump 13a to perform reverse rotation in a state where the actuation valve 24 is open. Therefore, in the modification described above, in the end process, cooling can be performed by opening the actuation valve 24 to circulate the aqueous urea, and the aqueous urea can be collected by reverse rotation of the pump 13a.

In the case of the modification shown in FIG. 3, also, the notification device 17 can provide notification of the end process mode. Specifically, when the actuation valve 24 is open and the pump 13a is performing reverse rotation, the control device 15 outputs the notification command to the notification device 17. Based on the notification command from the control device 15, the notification device 17 provides a notification that the actuation valve 24 is open and the aqueous urea is being circulated, or that the suction intake of the aqueous urea by the pump 13a is being performed. Moreover, similar to the embodiment described above, the notification device 17 may also provide an external notification that the end process is completed.

The embodiments disclosed herein are in all respects exemplary and should not be considered limiting. The scope of the present invention is indicated not by the preceding description but rather by the scope of the patent claims, and all modifications with an equivalent meaning and within the scope of the patent claims are included.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
an engine;
a battery;
an exhaust gas purification system that operates in a purification control mode and an end control mode;
said exhaust gas purification system comprising a fluid delivery system controlled by a controller and adapted to convey fluid from a storage tank to a nozzle that delivers the fluid into engine exhaust gas;
at least one engine operation sensor communicating with the controller; and
a notifier providing a notification one of:
during the end control mode;
at an end of the end control mode; or
indicating an end of the end control mode,
wherein, when a flow of the engine exhaust gas is determined to have stopped, the controller is configured to executed the end control mode.

2. The work vehicle according to claim 1, wherein the notifier is arranged on the work vehicle and adjacent the battery.

3. The work vehicle according to claim 1, wherein the notifier is arranged on the work vehicle and adjacent the work vehicle driver seat.

4. The work vehicle according to claim 1, wherein the exhaust gas purification system comprises:
a duct through which the fluid having a form of aqueous urea passes;
a nozzle injecting the aqueous urea into the flow of engine exhaust gas; and
a pump configured to pump the aqueous urea from the tank to the nozzle and vice versa and operating via power supplied from the battery.

5. The work vehicle according to claim 1, wherein the notifier is adapted to provide a visual indication.

6. The work vehicle according to claim 1, wherein the notifier is adapted to provide an audible indication.

7. A work vehicle comprising:
an engine;
a battery;
an exhaust gas purification system comprising a fluid delivery system controlled by a controller and adapted to convey fluid from a storage tank to a nozzle that delivers the fluid into engine exhaust gas;
at least one engine operation sensor communicating with the controller;
said exhaust gas purification system being configured to operate in a purification control mode and an end control mode, said purification control mode being activated by the controller when the engine is running so that an exhaust gas purification fluid is injected into an exhaust gas flow, and said end control mode being activated by the controlled after the engine has stopped running as determined by the at least one engine operation sensor; and
a notifier providing a notification one of:
during the end control mode;
at an end of the end control mode; or
indicating an end of the end control mode,
wherein, when engine operation is determined to have stopped by the at least one engine operation sensor, the controller is configured to executed the end control mode.

8. The work vehicle according to claim 7, wherein the notifier is arranged on the work vehicle and adjacent the battery.

9. The work vehicle according to claim 7, wherein the notifier is arranged on the work vehicle and adjacent the work vehicle driver seat.

10. The work vehicle according to claim 7, wherein the exhaust gas purification system comprises:
a duct through which the fluid having a form of aqueous urea passes;
a nozzle injecting the aqueous urea into the flow of engine exhaust gas; and
a pump configured to pump the aqueous urea from the tank to the nozzle and vice versa and operating via power supplied from the battery.

11. The work vehicle according to claim 7, wherein the notifier is adapted to provide a visual indication.

12. The work vehicle according to claim 7, wherein the notifier is adapted to provide an audible indication.

13. The work vehicle according to claim 7, wherein the exhaust gas purification system comprises:
a duct connected to a pump through which the fluid having a form of aqueous urea passes;
a nozzle injecting the aqueous urea into the flow of engine exhaust gas; and
the pump operating with electric power from the battery and being adapted to pump the aqueous from the tank to the nozzle and vice versa.

14. The work vehicle according to claim 13, wherein the exhaust gas purification device further comprises:
a circulation channel; and
an actuation valve coupled to the circulation channel and being supplied with electric power from the battery,
wherein the notifier is adapted to provide notification of when the actuation valve is open.

15. A method of providing notification on the work vehicle of claim 1, the method comprising:
providing a human detectable notification via the notifier, wherein the notification occurs one of:
during the end control mode; or
at an end of the end control mode.

16. A work vehicle comprising:
an engine;
a battery;
an exhaust gas purification system that operates in a purification control mode and an end control mode;
said exhaust gas purification system comprising a fluid delivery system controlled by a controller and adapted to convey fluid from a storage tank to a nozzle that delivers the fluid into engine exhaust gas;
at least one engine operation sensor communicating with the controller; and
an audio or visual notifier providing a notification one of:
during the end control mode;
at an end of the end control mode; or
indicating an end of the end control mode,
wherein, when engine operation is determined to have stopped by the at least one engine operation sensor and the fluid delivery system is operating in the end control mode, the notifier provides an audio or visual indicator that informs those who might perform a power interruption to wait until an end of the end control mode.

* * * * *

UNITED STATES PATENT AND TRADEMARK OFFICE
CERTIFICATE OF CORRECTION

PATENT NO. : 10,184,378 B2
APPLICATION NO. : 15/592552
DATED : January 22, 2019
INVENTOR(S) : H. Miyake It is certified that error appears in the above-identified patent and that said Letters Patent is hereby corrected as shown below:

In the Claims

At Column 9, Line 63, Claim 7, Line 25, please change "executed" to -- execute --.

At Column 10, Line 27, Claim 13, Line 8, please insert -- urea -- after aqueous.

Signed and Sealed this
Eighth Day of October, 2019

Andrei Iancu
*Director of the United States Patent and Trademark Office*